United States Patent [19]

Dunchock

[11] 4,326,726
[45] Apr. 27, 1982

[54] STORAGE RACK

[75] Inventor: Richard S. Dunchock, Farmington Hills, Mich.

[73] Assignee: SL Container Corporation, Southfield, Mich.

[21] Appl. No.: 148,742

[22] Filed: May 12, 1980

[51] Int. Cl.³ .......................... B62B 3/10; A47B 81/00
[52] U.S. Cl. ................... 280/79.1 A; 206/335; 211/13; 211/182; 248/176; 280/47.34
[58] Field of Search .............. 280/79.3, 79.1 A, 47.34, 280/47.35, 79.1 R; 211/182, 13, 28; 206/335; 248/127, 176

[56] References Cited

U.S. PATENT DOCUMENTS

| 402,340 | 4/1889 | Martin | 280/79.3 X |
|---|---|---|---|
| 1,441,264 | 1/1923 | Bruewer | 206/335 |
| 2,377,023 | 5/1945 | Milburn et al. | 280/79.3 X |
| 2,466,149 | 4/1949 | Burg | 280/79.3 |
| 2,681,233 | 6/1954 | Smith | 280/79.3 |
| 2,916,293 | 12/1959 | Lang | 280/79.3 |
| 2,980,438 | 4/1961 | Baer | 280/79.3 |
| 3,224,787 | 12/1965 | Andersen | 280/79.3 X |
| 3,540,753 | 11/1970 | Hanson | 280/47.34 |
| 3,693,996 | 9/1972 | Hardy | 280/79.3 |
| 3,949,528 | 4/1976 | Hartger et al. | 52/79.1 |
| 4,085,844 | 4/1978 | Dunchock | 206/335 |

Primary Examiner—Joseph F. Peters, Jr.
Assistant Examiner—Milton L. Smith
Attorney, Agent, or Firm—Basile, Weintraub & Hanlon

[57] ABSTRACT

A storage rack for storing an automobile top of the type which is adapted to be removably mounted to an automobile body. The storage rack of the present invention includes a frame contoured to abut and support a rear wall and a top wall of the automobile top when it has been placed in the rack for storage. A waterproof fabric cover is provided to enclose the top and rack while stored. A plurality of casters are provided to support the rack and allow the rack to be rolled from place to place.

4 Claims, 3 Drawing Figures

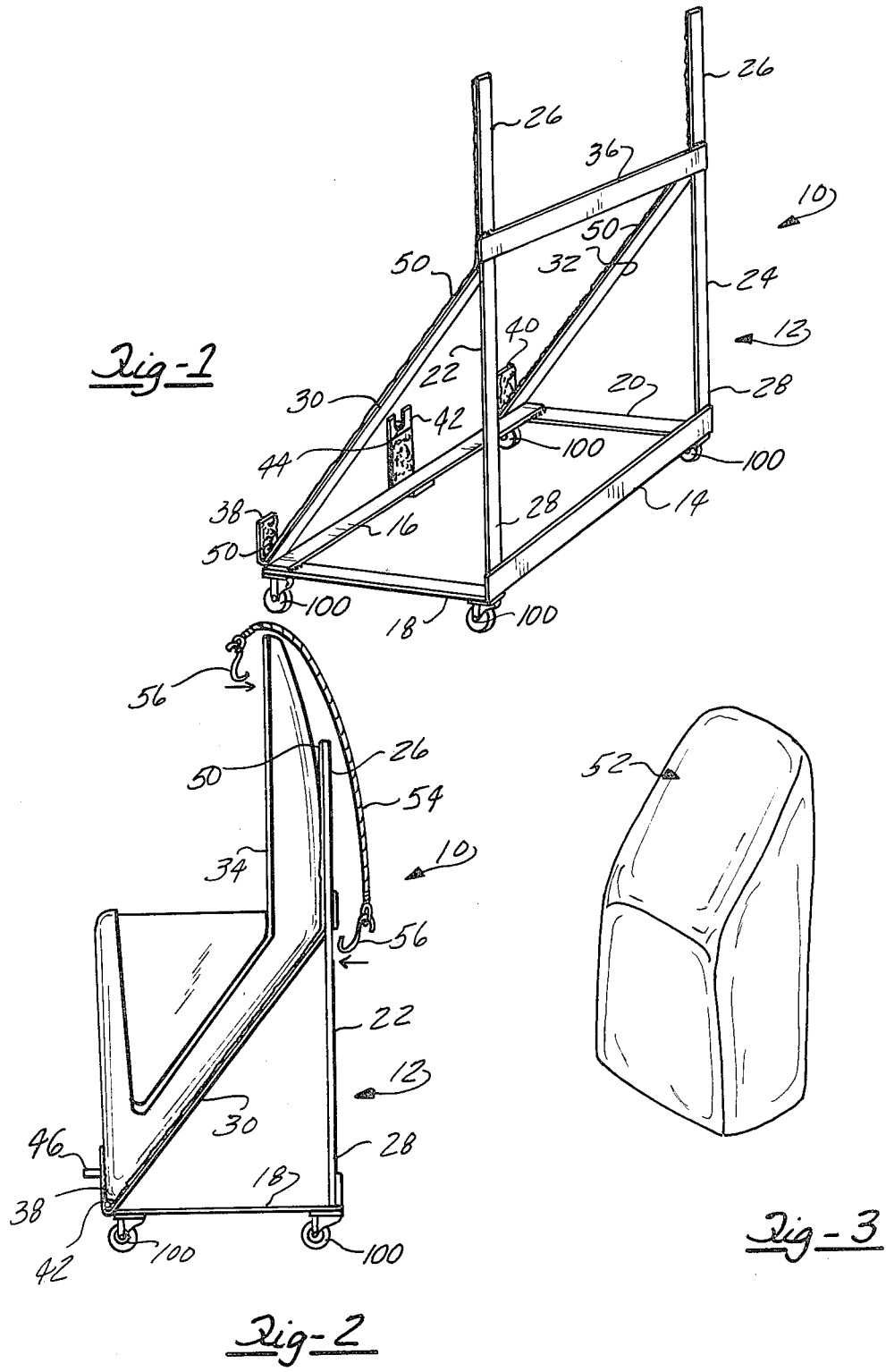

STORAGE RACK

BACKGROUND OF THE INVENTION

I. Field of the Invention

The present invention relates broadly to racks for storing items which may be easily damaged; and, in particular, the present invention relates to a storage rack for storing a removable automobile top.

II. Description of the Prior Art

Automobiles have been manufactured which include a removable hard top that is adapted to be releasably secured to the automobile body and removed from the automobile to provide the user of the automobile with a convertible vehicle. One known automobile of the type described is manufactured and marketed under the trademark MERCEDES-BENZ ROADSTER. This automobile has a hard top which includes side windows and a rear window, and is releasably attached to the automobile body. The top may be simply removed from the automobile body by two persons. Owners of such vehicles normally place the top in an upright position and generally store the top in the corner of a garage. U.S. Pat. No. 4,085,844 discloses a storage container for safely storing such tops. The removable hard top for the MERCEDES BENZ ROADSTER is very expensive and therefore must be handled and stored in a careful manner to insure that the windows, exterior painted surfaces, and interior matted surfaces are not damaged during a period when the hard top is in a stored position. The storage container described in U.S. Pat. No.; 4,085,844 adequately stores and protects the top while in storage. However, this storage container is relatively expensive as compared to the rack of the present invention. Other storage containers are disclosed in U.S. Pat. Nos.: 3,949,528; and 1,441,264. Racks for transporting articles of various description are disclosed in U.S. Pat. Nos.: 2,466,149; 2,916,293; 3,224,787; 3,540,753; and 3,693,996. These racks do not disclose structures to adequately store and protect a removable vehicle hard top as taught by the present invention.

It would therefore be desirable to provide a lightweight, inexpensive storage rack for storing and protecting automobile tops of the type described.

SUMMARY OF THE INVENTION

The present invention, which will be described subsequently hereinafter, comprises a storage rack for storing an automobile top of the type which is adapted to be releasably attached to automobile bodies. The automobile top storage rack comprises a frame adapted to abut a rear wall and top wall of the removable top and support the top along a lower rear edge thereof. The rack includes strips of felt bonded to the portions of the frame which abut the car top to protect the top from damage. Casters attached to a lower portion of the frame allow the rack to be easily rolled from place to place. A waterproof fabric cover is provided to enclose the top and rack to protect the top during storage.

It is therefore a primary object of the present invention to provide a new and improved storage rack for storing automobile tops.

It is a further object of the present invention to provide a storage rack of the type described which is of simple, lightweight design that is inexpensive to manufacture and maintain.

It is yet another object of the present invention to provide an automobile top storage rack which is easy to manipulate for the movement and storage of the automobile top.

Other objects, advantages, and applications of the present invention will become apparent to those skilled in the art of storage racks when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numbers refer to like parts throughout the several views, and wherein:

FIG. 1 is a perspective view of an automobile top storage rack constructed in accordance with the principles of the present invention;

FIG. 2 is a side view of the storage rack of FIG. 1 with a car top mounted thereon; and FIG. 3 is a perspective view of the rack of the present invention with a waterproof cover enclosing the top and rack.

DESCRIPTION OF THE PREFERRED EMBODIMENT

Referring now to the drawing and in particular to FIGS. 1 and 2 wherein there is illustrated one example of the present invention in the form of a storage rack 10. The storage rack 10 comprises a frame 12 including a first longitudinal member 14 and a second longitudinal member 16 spaced from the first longitudinal member, with a pair of spaced apart transverse members 18,20 integral with and extending between the longitudinal members to form a rectangular lower frame. A pair of spaced apart vertical members 22,24, each having an upper end 26 and a lower end 28 integral with the first longitudinal member, extend vertically upward from the first longitudinal member. The frame 12 further includes a pair of inclined side members 30,32 with each side member affixed to the second longitudinal member 16 at a lower end and affixed to a corresponding vertical member 22,24 at an upper end. The side members 30,32 are inclined to abut and support a rear wall of a vehicle top 34. A longitudinal brace 36 extends between vertical members 22,24 spaced down a distance from the upper end 26 of the vertical members 22,24 to provide structural integrity for the vertical members 22,24. A pair of cleats 38,40 are joined to the second longitudinal member 16 and extend vertically upward therefrom. A lock pin support 42 is centrally located along the second longitudinal support 16 extending vertically upward therefrom. The lock pin support 42 includes a pin receiving recess 44 formed in an upper end thereof to slidingly receive a lock pin 46 on the removable top 34. The lock pin 46 is affixed to a central portion of the rear edge of the removable top 34 and, when the lock pin 46 is in the recess 44, the removable top 34 is centrally positioned on the rack 12 with the recess 44 preventing lateral displacement of the top.

The upper end 26 of the vertical members and the inclined side members 30,32 are designed to mate with correspondingly spaced chrome sections disposed on the top of the roof of a MERCEDES BENZ ROADSTER and abut and support the roof without the automobile tops's painted surface coming in to contact with the frame 12. The spacing of the inclined side members 30,32 insures that the rear window of the top 34 is not damaged when the top is placed on the frame. Strips of felt 50 are bonded to the abutting surfaces of the upper end 26 of the vertical members 22,24, the inclined side members 30,32, the pair of cleats 38,40 and the lock pin support 42. The felt strips 50 are positioned between the frame 12 and the top 34 to prevent scratching of the painted surface or the chrome strip when the top 34 has been placed in the rack 12 for storage.

A plurality of casters 100 are affixed to the corners where the longitudinal members 12,14 and the transverse members 18,20 intersect. The casters 100 allow the rack 12 to be easily moved along the floor.

As can be seen in FIG. 3 of the drawing, a waterproof fabric cover 52 is provided to enclose the top and rack to prevent an accumulation of dust on the top during storage. When not in use the top 52 can be conveniently folded until placed in use again.

As illustrated in FIG. 2 of the drawing, an elastic cord 54 is provided to secure the top 34 to the rack 12. The elastic cord 54 includes a pair of hooks 56 to engage a front end of the top 34 at one end and the longitudinal brace 36 at another end. The elastic cord 54 is looped around the top 34 and with the hooks 56 engaging the top and the longitudinal brace to hold the top securely against the felt strips 50.

It can thus be seen that the Applicant has provided a new and improved rack for storing automobile tops in a manner which is convenient, inexpensive, and simple to manipulate by the user.

It should be understood by those skilled in the art to which this invention pertains that other forms of the Applicant's invention may be had, all coming within the spirit of the invention and the scope of the appended claims.

Having thus described my invention what I claim is:

1. An automobile top storage rack comprising:
a frame including a first longitudinal member, a second longitudinal member spaced from the first longitudianl member, a pair of spaced apart transverse members integral with and extending between the longitudinal members, a pair of spaced apart vertical members having an upper end and a lower end integral with and extending vertically upward from the first longitudinal member, a pair of inclined side members, each side member affixed to the second longitudinal member at a lower end and affixed to a corresponding vertical member at an upper end, the side members inclined to abut and support a rear wall of the top, a longitudinal brace extending between the vertical members spaced down a distance from each vertical members upper end, a pair of cleats joined to the second longitudinal member extending vertically upward therefrom, a lock pin support extending upward from the second longitudinal member having a pin receiving recess formed in an upper end thereof, a lock pin affixed to the top being slidingly engageable with said pin receiving recess to prevent lateral movement of the top, and an elastic cord including a hook at each end thereof, the hooks engaging the top and the frame to bias the top into abutment with the frame.

2. The automobile top storage rack as defined in claim 1 further comprising a plurality of casters supporting the rack to allow said rack to be rolled along a supporting surface.

3. The automobile top storage rack as defined in claim 1 further comprising strips of felt bonded to the inclined side members, an upper portion of the vertical member, the cleats, and the lock pin support where they abut the top.

4. The automobile top storage rack as defined in claim 1 further comprising a waterproof fabric cover enclosing the top and rack.

* * * * *